Patented June 26, 1951

2,558,013

UNITED STATES PATENT OFFICE 2,558,013

AQUEOUS ACID FLUORIDE COMPOSITIONS

Julian L. Staubly, Oreland, and William A. Millsaps, Philadelphia, Pa., assignors to The Pennsylvania Salt Manufacturing Company, Philadelphia, Pa., a corporation of Pennsylvania No Drawing. Application September 16, 1948, Serial No. 49,648

8 Claims. (Cl. 252—142)

This invention relates to improved acid fluoride rust-remover compositions, particularly aqueous acid fluoride compositions of improved fabric-wetting properties.

Compositions comprising aqueous solutions of acidic fluorides, for example, an aqueous solution of a bi-fluoride salt plus some added hydrofluoric acid, have long been used for treatment of fabrics, e. g. for removal of rust and similar stains. Such compositions, however, have heretofore not possessed the ability to wet fabrics readily and this has, of course, interfered greatly with their efficient use to remove rust and similar stains from fabrics.

Attempts have been made to improve the wetting properties of these compositions through addition of numerous commercially available surface active agents such as alkyl-aryl sulfonates, sulfated alcohols and non-ionic and cationic types of surface active agents. These agents have uniformly proven unsatisfactory either because of turbidity imparted to the product, or lack of improvement of wetting properties, or the instability of the surface active agent in the strongly acidic product.

It has also been known heretofore that addition of lower aliphatic alcohols to water solutions improves the rate of fabric penetration of such solutions. However, such organic materials have not heretofore been used in highly reactive acid fluoride solution such as those under discussion, since from past experience it has seemed essential that quantities in the neighborhood of 20% or more of the alcohol in the aqueous solutions be used in order to obtain substantial improvement in fabric-wetting or penetration properties.

We have now discovered that certain of the lower aliphatic alcohols and related compounds surprisingly improve the fabric-wetting properties of the aqueous solutions of acid fluoride used for rust removing and similar treatment of fabrics, even when such organic compounds are employed in very small amount, and that the mixtures have satisfactory stability.

The addition agents of our invention include the water-soluble, relatively low molecular weight, aliphatic compounds in which a hydrophilic oxygen-containing group other than a free carboxylic acid group is the principal functional group of the compound. This may be a carbonylic group, or especially the group —OR, R being hydrogen or alkyl or acyl. More than one such group may be present. Such compounds to be advantageous in our invention should be soluble in a 40% by weight aqueous solution of acid fluorides to the extent of at least 0.25% by weight, and should also be surface tension depressants for such solutions (i. e. when the organic addition agent is dissolved in the acid fluoride solution to the extent of 0.25 to 15% by weight, it substantially lowers the surface tension of the solution, bringing it to a value below 50 dynes per cm.). Examples of such compounds include methyl, ethyl, propyl, isopropyl and the various butyl alcohols, the various ethylene glycol ethers, e. g. butyl Cellosolve (the monobutyl ether of ethylene glycol) methyl Cellosolve (the monomethyl ether of ethylene glycol) and ethyl Cellosolve (the monoethyl ether of ethylene glycol), the various diethylene glycol ethers, e. g. butyl Carbitol (the monobutyl ether of diethylene glycol), methyl Carbitol (the monomethyl ether of diethylene glycol) and ethyl Carbitol (the monoethyl ether of diethylene glycol), esters such as ethyl lactate, butyl acetate, methyl acetate and amyl acetate, and dihydric alcohols such as ethylene glycol, 1,5-pentanediol and 2-methyl-2,4-pentanediol. We have found that as little as one-fourth of 1 per cent of such addition agents give a marked improvement to the fabric-wetting properties of aqueous solutions of acid fluorides. Preferably from 1 to 5% of the addition agent is employed and our invention contemplates employing larger quantities, if desired, up to about 10% or even 15%.

The aqueous acid fluoride compositions whose fabric-wetting properties are improved by our addition agents include aqueous solutions containing from 5 to 60% total acidity as HF, both free and combined (e. g. as acid fluoride salts). Preferably such compositions contain from 10 to 30% total acidity, and although free hydrofluoric acid may be the only fluoride present, in practice at least a part of this is combined as an acid fluoride salt. Suitable acid fluoride salts include the various water-soluble bifluorides, e. g. ammonium bi-fluoride, sodium bifluoride, potassium bifluoride and other water-soluble metallic bifluorides.

The following examples are illustrative of our invention.

Example I

The following composition was prepared:

| | Percent by weight |
|---|---|
| Ammonium bifluoride | 28.7 |
| Hydrofluoric acid | 12.0 |
| Water | 58.3 |
| Butyl Carbitol (the monobutyl ether of diethylene glycol) | 1.0 |

In a fabric-wetting test the above composition was found to penetrate woolen test fabric in less than one second, whereas the same composition without the butyl Carbitol was found to stand upon the surface of the fabric for over one hour.

*Example II*

The following composition was prepared:

| | Percent by weight |
|---|---|
| Ammonium bifluoride | 28.7 |
| Hydrofluoric acid | 12.0 |
| Water | 55.3 |
| Isopropyl alcohol | 4.0 |

In a fabric-wetting test the above composition was found to penetrate woolen test fabric in less than one second. The same composition without the isopropyl alcohol was found to stand upon the surface of the fabric for over one hour.

*Example III*

A series of compositions was prepared containing ammonum bifluoride and hydrofluoric acid as in the prior examples. The percent by weight indicated below of each of the indicated addition agents was included in the various test solutions of this series, and the time of penetration of fabric for each of these was as indicated below:

| Addition Agent | Time |
|---|---|
| 10% Methyl Cellosolve (the monomethyl ether of ethylene glycol). | 4 minutes. |
| 10% Ethyl Cellosolve (the monoethyl ether of ethylene glycol). | 1 second. |
| 2% Ethyl Cellosolve (the monoethyl ether of ethylene glycol). | 4 minutes 10 seconds. |
| 10% Ethyl Carbitol (the monoethyl ether of diethylene glycol). | 17 seconds. |
| 10% Ethyl acetate | 1 second. |
| 2% Ethyl acetate | Do. |
| 2% Butyl acetate | 5 seconds. |
| 2% Amyl acetate | 3 seconds. |
| 10% Methyl ethyl ketone | 1 second. |
| 10% Acetone | 17 seconds. |
| 15% Ethylene glycol | 2 seconds. |

In parallel tests, in each case, the same ammonium bifluoride and hydrofluoric acid solution without addition agent stood upon the fabric for over one hour.

In each of the above examples, in the place of the ammonium bifluoride, sodium bifluoride, potassium bifluoride, or simply hydrofluoric acid can be employed and essentially the same effect is observed. In the place of the particular organic addition agent named in each of the above examples, any one of the following may be employed:

Methyl alcohol
Ethyl alcohol
n-Propyl alcohol
Butyl alcohol
1,5-Pentanediol
2-Methyl-2,4-pentanediol
Methyl acetate
Ethyl lactate
Butyl Cellosolve (the monobutyl ether of ethylene glycol)
Methyl Carbitol (the monoethyl ether of diethylene glycol)

and essentially the same results are observed.

The above examples and description of our invention are intended to be illustrative only and our invention is not to be limited thereby.

We claim:

1. An aqueous acid fluoride composition containing from about 5% to about 60% by weight total HF equivalent including both free and combined hydrogen fluoride and containing in solution from 0.25% to 15% by weight of an aliphatic compound in which a hydrophilic oxygen-containing group other than a free carboxylic acid group is the principal functional group of the compound and which contains no other group interfering with the hydrophilic function of the oxygen-containing group, said aliphatic compound containing no more than ten carbon atoms and said oxygen-containing group being selected from the class consisting of alcohol groups, carbonyl groups, and ester groups.

2. An aqueous acid fluoride composition containing from about 10% to about 30% by weight total HF equivalent including both free and combined hydrogen fluoride and containing in solution from 0.25% to 15% by weight of an aliphatic compound in which a hydrophilic oxygen-containing group other than a free carboxylic acid group is the principal functional group of the compound and which contains no other group interfering with the hydrophilic function of the oxygen-containing group, said aliphatic compound containing no more than ten carbon atoms and said oxygen-containing group being selected from the class consisting of alcohol groups, carbonyl groups, and ester groups.

3. The composition of claim 1 in which the hydrophilic oxygen-containing group is a hydroxy group and the aliphatic compound is present in the amount of from 0.25% to 10% by weight of the composition.

4. The composition of claim 2 in which the hydrophilic oxygen-containing group is a hydroxy group and the aliphatic compound is present in the amount of from 0.25% to 10% by weight of the composition.

5. The composition of claim 1 in which the hydrophilic oxygen-containing group is an alcohol group.

6. The composition of claim 1 in which the hydrophilic oxygen-containing group is an ester group.

7. The composition of claim 2 in which the hydrophilic oxygen-containing group is an alcohol group.

8. The composition of claim 2 in which the hydrophilic oxygen-containing group is an ester group.

JULIAN L. STAUBLY.
WILLIAM A. MILLSAPS.

REFERENCES CITED

The following references are of record in the file of this patent:

UNITED STATES PATENTS

| Number | Name | Date |
|---|---|---|
| 2,399,134 | Miller et al. | Apr. 23, 1946 |